Patented Dec. 2, 1947

2,431,967

UNITED STATES PATENT OFFICE 2,431,967

ALKYL ESTERS OF ALPHA-ACYLAMINO, BETA-CARBOALKOXYMETHYL MERCAPTO SUBERIC ACID

Sidney R. Safir and Seymour Bernstein, Pearl River, and Bernard R. Baker, Nanuet, N. Y., assignors, by mesne assignments, to American Cyanamid Company, New York, N. Y., a corporation of Maine No Drawing. Application February 14, 1945, Serial No. 577,945

4 Claims. (Cl. 260—470)

1

The present invention relates to new organic compounds and to methods of preparing them.

The new compounds of the present invention and the reaction by which they are formed may be illustrated by the following equation:

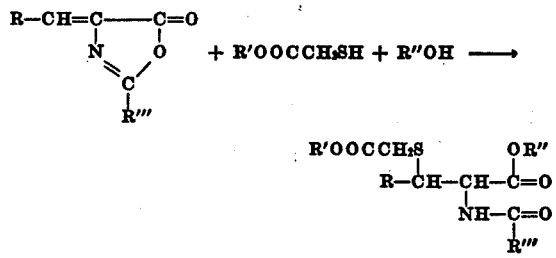

In the above, R is an alkyl or carboalkoxyalkyl radical, R' and R'' are alkyl radicals and R''' is an alkyl, cycloalkyl, or aryl radical.

As will be seen, the reaction involves opening of the azlactone ring, formation of an ester with the alcohol, R''OH, and addition of the thioglycolate at the carbon-carbon double-bond. Whether these reactions take place simultaneously or in sequence has not been determined by us as yet. We have found, however, that the azlactone ring may be opened by heating with an alcohol and the reaction completed by subsequent reaction with the thioglycolate, and our new compounds may be prepared in this manner if desired. Inasmuch as this latter procedure requires two distinct steps and as we have found that both reactions can be made to take place in one step by merely mixing the various reactants together, we prefer the process illustrated by the equation above.

The azlactone intermediate employed in our process appears to be a new compound and its preparation from known compounds is described in the specific examples which follow. The azlactone used may be one in which R is an alkyl radical, such as methyl, ethyl, butyl, hexyl, octyl, or the like, or it may be a carboalkoxyalkyl radical, —(CH₂)ₙCOOR, in which n is a small whole number 1 to 6 and R is an alkyl group as defined above. The nature of R depends upon the choice of intermediates used in preparing the azlactone. The radical R''' may be an alkyl, cycloalkyl, or aryl radical and it, too, depends upon the particular intermediates used in the preparation of the azlactone.

The thioglycolate used is an alkyl ester of thioglycolic acid and R' may be methyl, ethyl, propyl, butyl, octyl, dodecyl, octadecyl, or the like. The alcohol, R''OH, is preferably a short chain aliphatic alcohol such as methyl, ethyl, propyl, butyl, amyl, or other readily available alcohol.

The reaction is best carried out in an anhydrous solvent, preferably an alcohol corresponding to R''OH. Other inert anhydrous solvents, such as dioxane, chloroform, benzene, or the like, may be used to replace part of the alcohol if desired. Enough alcohol should be present, however, to supply the requirements of the reaction equation. Of course, if the reaction is carried out in two stages, solvents other than alcohol may be used in the second phase of the reaction in which the thioglycolate is added.

The reaction takes place under a wide range of temperatures, from about 20° C. to 120° C. Ordinarily we prefer to carry out the reaction at the temperature of the refluxing reaction mixture, which will depend, of course, upon the particular alcohol or other solvent or solvent mixture used. The time required to complete the reaction will vary from about one hour to 72 hours, more or less, depending upon the temperature at which the reaction is conducted. Obviously, lower temperatures require longer periods of time.

In our preferred process a strong, or moderately strong, alkaline substance is used as a catalyst. Pyridine is a preferred catalyst but other alkaline substances such as sodium hydroxide, potassium hydroxide, sodium methoxide, and the like, may be used.

The compounds of the present invention are generally obtained as light to viscous oils, varying in color from a pale yellow to a dark yellow. They are useful as intermediates in the preparation of other organic compounds, for example, biotin.

Our invention will now be illustrated in greater particularity by means of the following examples in which representative compounds are prepared from known intermediates. It will be understood that these examples are given for purposes of illustrating preferred processes of the present invention and are not to be construed as limiting the invention to the processes or products described therein. All parts are by weight unless otherwise indicated.

*Example 1*

To a mixture of 13.5 g. of ethyl delta-formylvalerate, 19 cc. of dry pyridine and 17 g. of malonic acid was added 0.5 cc. of piperidine. The temperature was kept below 40° C. After twenty-one hours at room temperature, the mixture was diluted with water and extracted with benzene.

The benzene layer was washed twice with dilute hydrochloric acid. It was then extracted with sodium bicarbonate solution. The bicarbonate fraction was acidified and extracted with benzene. Evaporation of the benzene extract gave 6.5 g. of 7-carbethoxy-2-heptenoic acid in the form of an oil.

To a solution of 2.0 g. of 7-carbethoxy-2-heptenoic acid in 40 cc. of methanol was added 3.2 g. of mercuric acetate and the mixture was shaken at room temperature for one day. The mixture was then filtered and the colorless solid obtained was washed with methanol and dried. The yield was 3.75 g. of 2-acetoxymercuri-3-methoxy-7-carbethoxy-heptanoic acid as shown by analysis.

To a cooled (5° C.) stirred solution of 3.75 g. of 2-acetoxymercuri-3-methoxy-7-carbethoxy-heptanoic acid, and 1.8 g. of potassium bromide in 10 cc. of water was added dropwise a solution prepared from 1.6 g. of bromine; 1.8 g. of potassium bromide and 3.5 cc. of water. The bromination was performed in an open beaker illuminted by a No. 2 photoflood light. The addition required thirty-five minutes. The mixture was then stirred for one additional hour, the excess bromine was removed with sodium bisulfite, the solution was washed once with ether and the aqueous layer was acidified with 3 cc. of 42% hydrobromic acid. The mixture was extracted with ether, the ether layer was washed with saturated saline, dried and evaporated. The yield of 2-bromo-3-methoxy-7-carbethoxyheptanoic acid was 2.1 g., obtained as a colorless oil.

A mixture of 6.2 g. of 2-bromo-3-methoxy-7-carbethoxyheptanoic acid and 8.4 cc. of 0.5 N sodium hydroxide was cooled to 15° C. and stirred while 8.4 cc. of 5 N sodium hydroxide was added dropwise during thirty-five minutes. The solution was then stirred for an additional fifty minutes at 25° C., washed once with ether and acidified. Sodium chloride was added and the oil was extracted with ether. The ether layer was washed with saturated saline, dried and evaporated. The yield of α-bromo-β-methoxysuberic acid was 5.4 g.

A solution of 56 g. of α-bromo-β-methoxysuberic acid in 600 cc. of 28% ammonia was heated in an autoclave at 100° C. for six hours. The solution was shaken with Norite, filtered and the filtrate was evaporated to dryness. The gummy reside was dissolved in water and the solution was evaporated to dryness. The process was repeated twice more. Finally, the residue was slurried in water and filtered. The yield of α-amino-β-methoxysuberic acid was 15.4 g., obtained as a colorless solid.

To a solution of 0.5 g. of α-amino-β-methoxysuberic acid in 4.6 cc. of 1 N sodium hydroxide was added with stirring and cooling (5°–10° C.) during ten minutes 0.64 g. benzoyl chloride and 6.8 cc. 1 N sodium hydroxide. When the odor of benzoyl chloride had disappeared, 6.8 cc. of 1 N hydrochloric acid was added. The gummy solid was filtered and leached with hot petroleum ether. The residual, insoluble gum, α-benzoylamino-β-methoxysuberic acid weighed 0.32 g. The aqueous mother liquor yielded an additional 0.38 g. of product by extraction with ether, evaporation and leaching with hot petroleum ether.

To a 0° C. solution of 3.8 g. of α-benzoylamino-β-methoxysuberic acid in 40 cc. of dry pyridine was added during five minutes with gentle shaking, 3.3 g. benzoyl chloride. The mixture was kept at 0° C. five minutes longer, then poured into iced, dilute hydrochloric acid. The mixture was extracted with ether, the ether layer was washed with cold, dilute hydrochloric acid, followed by saturated saline, then dried and evaporated. The residue, 5.7 g., consisted of a mixture of azlactone of 2-benzoylamino-7-carboxy-2-heptenoic acid and benzoic acid.

A mixture of 4.9 g. of the above crude compound, 50 cc. of dry ethanol, 50 cc. of dry benzene and 4 cc. of sulfuric acid was refluxed three hours in a Soxhlet apparatus containing magnesium sulfate in the thimble. The solution was diluted with water, the organic layer was separated, washed with saturated saline, sodium bicarbonate, and finally again with saline. The benzene solution was dried and evaporated, the final phase being done at 100°/2 mm. to remove ethyl benzoate. The residual light brown oil weighing 2.2 g. was ethyl 2-benzoylamino-7-carbethoxy-2-heptenoate.

A mixture of 7.7 g. of ethyl 2-benzoylamino-7-carbethoxy-2-heptenoate, 4.0 g. ethylthioglycolate and 50 cc. of dry ethanol was treated with 0.4 cc. of piperidine and kept at 25° C. for three days, then refluxed for five and one-half hours. The solution was evaporated to dryness at 90°/0.5 mm. The residual oil was taken up in ether, washed thoroughly with iced 1 N sodium hydroxide, then with saturated salt solution, dried and evaporated. The yield of ethyl α-benzoylamino-β-(carbethoxymethylthio) suberate was 9.2 g. (89%) obtained as a light yellow oil.

*Example 2*

A mixture of 2.2 g. of ethyl 2-benzoylamino-7-carbethoxy-2-heptenoate, 0.84 g. of ethyl thioglycolate, and 25 cc. of dry ethanol was treated with four drops of piperidine and kept at 25° C. for two days. Then 0.15 g. of additional ethyl thioglycolate and one drop of piperidine were added and the solution was evaporated to dryness, finally at 80°/2 mm. for forty-five minutes. The oily residue weighed 2.8 g., a yield of 79% of ethyl α-benzoylamino-β-(carbethoxymethylthio) suberate.

*Example 3*

To a stirred mixture of 3.4 g. of hippuric acid, 1.6 g. of anhydrous sodium acetate and 11.6 g. of acetic anhydride was added, during fifteen minutes, 30 g. of ethyl delta-formylvalerate. The resulting mixture was heated at 60° C. for three hours with stirring, then poured into iced water. The oil which separated was extracted with ether, the ether solution was dried and evaporated. The residue, an orange-red oil, on analysis proved to be the azlactone of 2-benzoylamino-7-carbethoxy-2-heptenoic acid.

A solution of 6.6 g. of the azlactone of 2-benzoylamino-7-carbethoxy-2-heptenoic acid and 2.6 cc. of ethylthioglycolate in 33 cc. of dry ethanol was treated with 0.1 cc. of piperidine and refluxed one-half hour. Then an additional 0.1 cc. of piperidine was added and the solution was refluxed one-half hour longer. Upon evaporation to dryness, 7.5 g. of an oil was obtained. A mixture of the oil, 30 cc. of dry ethanol, 2.6 cc. of ethylthioglycolate and 0.2 cc. of piperidine was refluxed two and one-half hours, then evaporated to dryness. The yield of ethyl α-benzoylamino-β-(carbethoxy-methylthio) suberate was 7.3 g., obtained as an oil.

*Example 4*

To a stirred mixture of 17.9 g. of hippuric acid and 8.2 g. of sodium acetate in 50 cc. of acetic anhydride was added 50 cc. of freshly distilled acetaldehyde during the course of one hour at 25° C. The mixture was then stirred at a bath temperature of 50°–60° C. for eight hours, cooled and poured into iced water. The solid was filtered off and recrystallized from dilute alcohol; yield 6.2 g. The product, α-benzoylaminocrotonic acid azlactone, on further recrystalization from ether had a melting point of 87°–89° C.

To a mixture of 1.9 g. of α-benzoylaminocrotonic acid azlactone, 1.2 cc. of ethyl thioglycolate and 15 cc. of absolute ethanol was added five drops of piperdine. The azlactone soon dissolved with a slight heat evolution. After four days the solution was evaporated to dryness in vacuo. The residue was a viscous oil weighing 3.5 g. which on analysis proved to be ethyl α-benzoylamino - β - (carbethoxy - methylthio)-butyrate.

In addition to the above, compounds such as methyl α - benzoylamino -β- (carbethoxymethylthio)-suberate, methyl α-benzoylamino-β-(carbomethoxymethylthio)-suberate, ethyl α-benzoylamino -β- (carbomethoxymethylthio) - suberate, ethyl α-naphthoylamino -β- (carbethoxymethylthio) - suberate, methyl α - naphthoylamino-β-(carbethoxymethylthio)-suberate, ethyl α-naphthoylamino-β-(carbethoxymethylthio) - butyrate, ethyl α - benzoylamino-β-(carbomethoxymethylthio)-butyrate, ethyl α - benzoylamino-β-(carbethoxymethylthio))-pimelate, methyl α - benzoylamino-β-(carbethoxymethylthio) - pimelate, ethyl α-naphthoylamino -β- (carbethoxymethylthio) pimelate, and others may be prepared in like manner using intermediates having the appropriate substituents.

What we claim is:

1. A compound having the formula

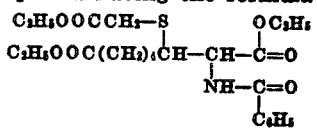

2. A method of preparing a compound having the formula

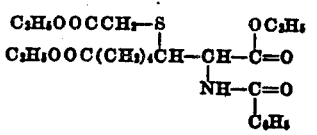

which comprises mixing together and causing to react in the presence of pyridine, ethyl alcohol, ethyl thioglycolate and a compound having the formula

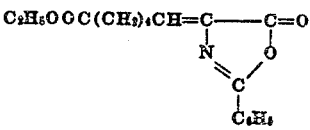

3. Chemical compounds having the general formula:

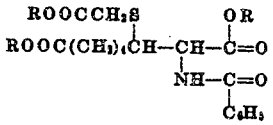

in which R is a lower alkyl radical.

4. A method of preparing compounds having the general formula:

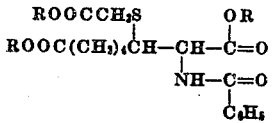

in which R is a lower alkyl radical which comprises mixing together and allowing to react a lower aliphatic alcohol, a lower alkyl ester of thioglycolic acid, and a compound having the formula:

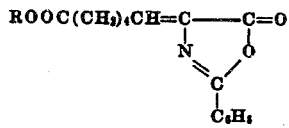

in which R is as defined above.

SIDNEY R. SAFIR.
SEYMOUR BERNSTEIN.
BERNARD R. BAKER.

REFERENCES CITED

The following references are of record in the file of this patent:

(I) Carter et al., "Jour. Biol. Chem.," vol. 129 (1939), pp. 359–369.

(II) Carter et al., "Jour. Biol. Chem.," vol. 139 (1941), pp. 247–254.

Nicolet (I), "Jour. Biol. Chem.," vol. 95 (1932), pp. 389–392.

Nicolet (II), "J. A. C. S.," vol 53 (1931), pp. 3066–3072.